United States Patent
Tsunoya

(10) Patent No.: US 11,697,158 B2
(45) Date of Patent: Jul. 11, 2023

(54) THREE-DIMENSIONAL SHAPING METHOD

(71) Applicant: SEIKO EPSON CORPORATION, Tokyo (JP)

(72) Inventor: Akihiko Tsunoya, Okaya (JP)

(73) Assignee: Seiko Epson Corporation, Tokyo (JP)

(*) Notice: Subject to any disclaimer, the term of this patent is extended or adjusted under 35 U.S.C. 154(b) by 98 days.

(21) Appl. No.: 17/122,430

(22) Filed: Dec. 15, 2020

(65) Prior Publication Data

US 2021/0187616 A1     Jun. 24, 2021

(30) Foreign Application Priority Data

Dec. 18, 2019  (JP) .................. 2019-228029

(51) Int. Cl.
*B22F 10/47*  (2021.01)
*B33Y 10/00*  (2015.01)
*B22F 10/14*  (2021.01)
*B28B 11/24*  (2006.01)
*B22F 10/43*  (2021.01)

(52) U.S. Cl.
CPC ............ *B22F 10/47* (2021.01); *B22F 10/14* (2021.01); *B22F 10/43* (2021.01); *B28B 11/243* (2013.01); *B33Y 10/00* (2014.12)

(58) Field of Classification Search
CPC .......... B22F 10/47; B22F 10/14; B22F 10/43; B22F 2999/00; B22F 5/10; B22F 3/1021; B22F 2003/1042; B28B 11/243; B33Y 10/00; B33Y 40/20; Y02P 10/25; B29C 64/165

See application file for complete search history.

(56) References Cited

FOREIGN PATENT DOCUMENTS

JP     2010-100883        5/2010
JP     2010100883 A  *  5/2010

* cited by examiner

*Primary Examiner* — Anthony M Liang
*Assistant Examiner* — Danny N Kang
(74) *Attorney, Agent, or Firm* — Workman Nydegger

(57) ABSTRACT

A three-dimensional shaping method includes a molded body forming step of forming a molded body having a plurality of projection portions using a material containing a powder and a binder, a supporting step of supporting the molded body by a support having groove portions at positions configured to insert each of the projection portions in a state where the plurality of projection portions are inserted into the groove portions, and a sintering step of sintering the powder by heating the molded body in a state of being supported by the support, wherein the groove portion is extended from an insertion position of the projection portion in a specified direction that specifies a direction of shrinkage of the molded body by performing the sintering step.

7 Claims, 15 Drawing Sheets

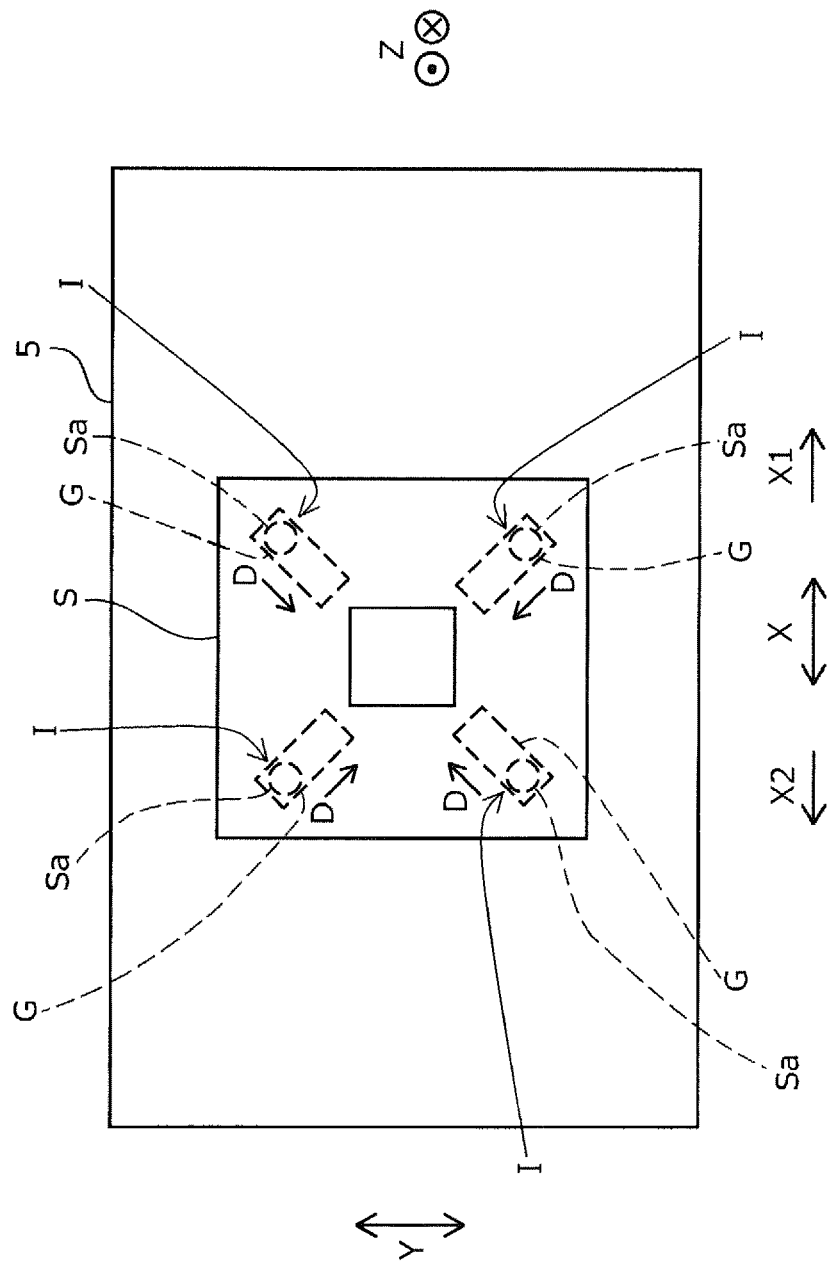

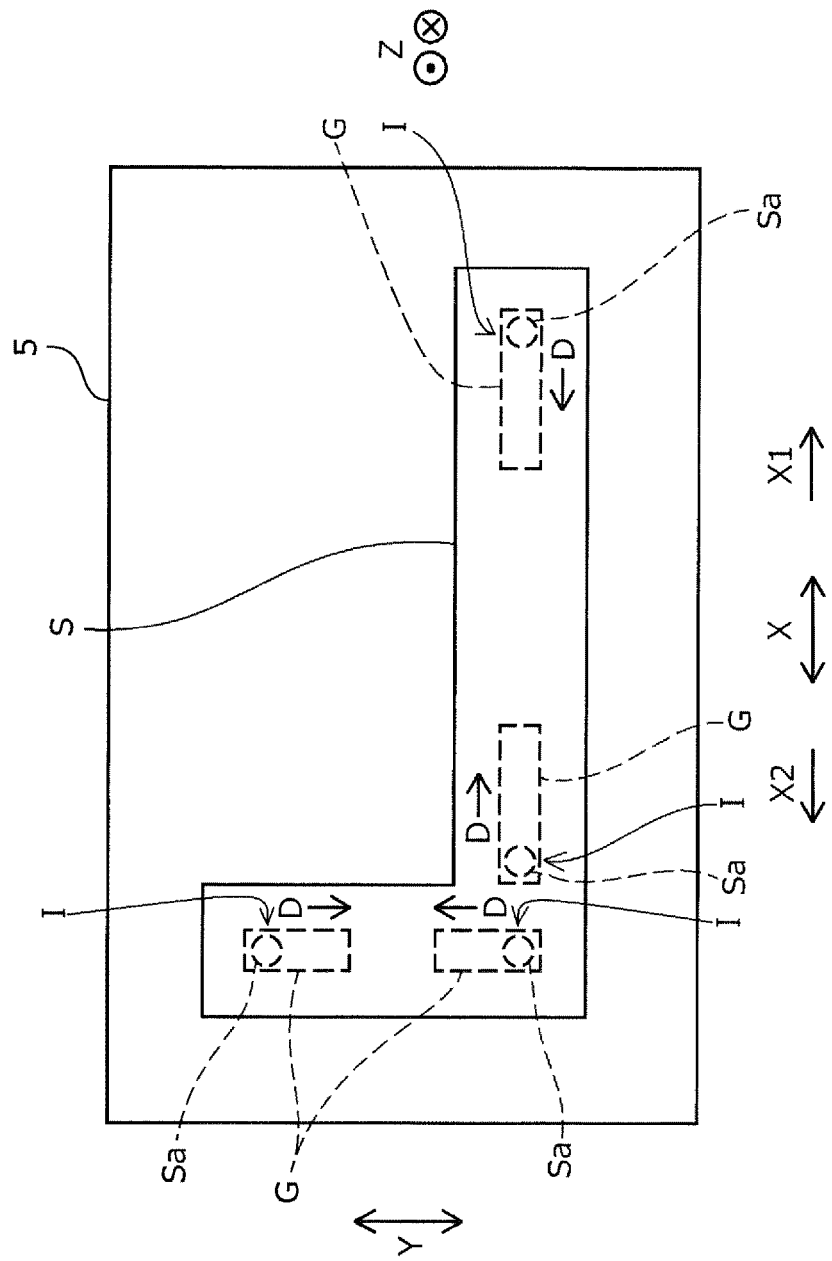

THREE-DIMENSIONAL SHAPING METHOD

The present application is based on, and claims priority from JP Application Serial Number 2019-228029 filed on Dec. 18, 2019, the disclosure of which is hereby incorporated by reference herein in its entirety.

BACKGROUND

1. Technical Field

The present disclosure relates to a three-dimensional shaping method.

2. Related Art

Heretofore, a three-dimensional shaping method for shaping a three-dimensional shaped article by forming a molded body using a material containing a powder and a binder, and heating the molded body, thereby sintering the powder has been used. When such a three-dimensional shaping method is performed, a molded body is shrunk with the progress of a sintering step. When a molded body is shrunk, various problems can occur. Therefore, JP-A-2010-100883 (Patent Document 1) discloses a technique for suppressing peeling from a shaping plate due to shrinkage of a molded body using an anchor effect by adopting a configuration in which a recess portion is provided in the shaping plate and a portion of the molded body is hooked in the recess portion.

When a molded body is formed using a material containing a powder and a binder, and the molded body is heated, thereby sintering the powder, a problem that a three-dimensional shaped article is distorted with the progress of the sintering step sometimes occurs. Even if the technique disclosed in Patent Document 1 was used, the molded body was shrunk in a state where the portion of the molded body is hooked in the recess portion, and the distortion of the three-dimensional shaped article sometimes became large instead.

SUMMARY

A three-dimensional shaping method according to the present disclosure for solving the above problem includes a molded body forming step of forming a molded body having a plurality of projection portions using a material containing a powder and a binder, a supporting step of supporting the molded body by a support having groove portions at positions configured to insert each of the projection portions in a state where the plurality of projection portions are inserted into the groove portions, and a sintering step of sintering the powder by heating the molded body in a state of being supported by the support, wherein the groove portion is extended from an insertion position of the projection portion in a specified direction that specifies a direction of shrinkage of the molded body by performing the sintering step.

BRIEF DESCRIPTION OF THE DRAWINGS

FIG. 14 is a schematic plan view showing a state where a molded body having a different shape from those of the molded bodies in FIGS. 4, 7, 9, 11, and 13 is supported by a support as an example.

FIG. 15 is a schematic plan view showing a state where a molded body having a different shape from those of the molded bodies in FIGS. 4, 7, 9, 11, 13, and 14 is supported by a support as an example.

DESCRIPTION OF EXEMPLARY EMBODIMENTS

Figure 1:
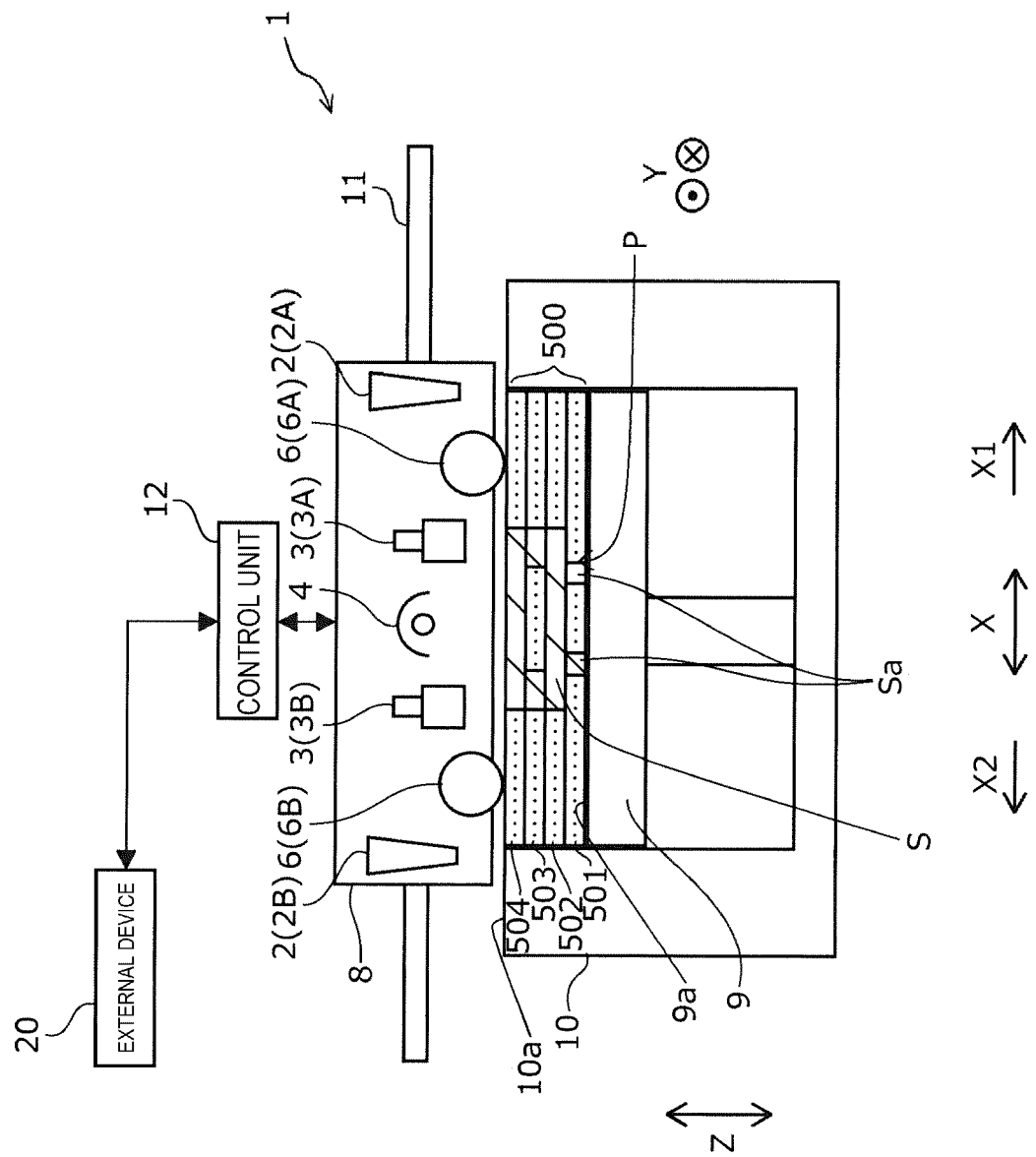
FIG. 1 is a schematic configuration diagram showing an example of a three-dimensional shaping apparatus capable of forming a molded body in a three-dimensional shaping method according to the present disclosure.

First, the present disclosure will be schematically described.

A three-dimensional shaping method according to a first aspect of the present disclosure for solving the above problem includes a molded body forming step of forming a molded body having a plurality of projection portions using a material containing a powder and a binder, a supporting step of supporting the molded body by a support having groove portions at positions configured to insert each of the projection portions in a state where the plurality of projection portions are inserted into the groove portions, and a sintering step of sintering the powder by heating the molded body in a state of being supported by the support, wherein the groove portion is extended from an insertion position of the projection portion in a specified direction that specifies a direction of shrinkage of the molded body by performing the sintering step.

According to this aspect, a molded body having a plurality of projection portions is formed, and a sintering step is performed while specifying a direction of shrinkage of the molded body in a state where the plurality of projection portions are inserted into groove portions. According to this, the direction of shrinkage of the molded body can be specified, and therefore, by forming the groove portions extended in a specified direction according to the shape of the molded body, the molded body can be shrunk without applying an excessive force to the molded body, so that distortion of a three-dimensional shaped article can be suppressed.

In a three-dimensional shaping method according to a second aspect of the present disclosure, in the first aspect, the specified direction is a direction along a direction of a straight line coupling at least two of the plurality of projection portions.

According to this aspect, the specified direction is a direction along a direction of a straight line coupling at least two of the plurality of projection portions. The intervals of the plurality of projection portions become smaller with the progress of the sintering step, however, by setting the specified direction to a direction along the direction of a straight line coupling two projection portions, distortion by applying an excessive force to the molded body can be effectively suppressed.

In a three-dimensional shaping method according to a third aspect of the present disclosure, in the first or second aspect, the specified direction is a direction along a longitudinal direction of the molded body.

According to this aspect, the specified direction is a direction along a longitudinal direction of the molded body. The molded body is largely shrunk along the longitudinal direction of the molded body with the progress of the sintering step, however, by setting the specified direction to a direction along the longitudinal direction of the molded body, distortion by applying an excessive force to the molded body can be effectively suppressed.

In a three-dimensional shaping method according to a fourth aspect of the present disclosure, in any one of the first to third aspects, the groove portion has a width that becomes narrower toward a direction of being extended from the insertion position of the projection portion.

According to this aspect, the groove portion has a width that becomes narrower toward a direction of being extended from the insertion position of the projection portion. The molded body is shrunk as a whole with the progress of the sintering step, and therefore, the projection portion is also shrunk, however, even if the projection portion is shrunk and narrowed, by configuring such that the groove portion has a width that becomes narrower toward a direction of being extended from the insertion position of the projection portion, deviation from the specified direction due to the narrowing of the projection portion can be suppressed.

In a three-dimensional shaping method according to a fifth aspect of the present disclosure, in any one of the first to fourth aspects, the projection portion is in a columnar shape, a cylindrical shape, or a conical shape.

According to this aspect, the projection portion is in a columnar shape, a cylindrical shape, or a conical shape, and therefore, the projection portion is hooked in the groove portion when the molded body is shrunk with the progress of the sintering step, and distortion by applying an excessive force to the molded body can be effectively suppressed.

In a three-dimensional shaping method according to a sixth aspect of the present disclosure, in any one of the first to fifth aspects, the powder is a metal powder.

According to this aspect, the powder is a metal powder. Therefore, a sturdy metallic three-dimensional shaped article in which distortion is suppressed can be shaped.

In a three-dimensional shaping method according to a seventh aspect of the present disclosure, in any one of the first to sixth aspects, the support is made of a ceramic.

According to this aspect, the support is made of a ceramic. Therefore, a three-dimensional shaped article can be shaped at the support having excellent thermal properties such as heat resistance, thermal expansion, heat conduction, and thermal shock resistance.

Hereinafter, embodiments according to the present disclosure will be described with reference to the accompanying drawings.

First, one embodiment of a three-dimensional shaping apparatus 1 capable of performing a molded body forming step in a three-dimensional shaping method according to the present disclosure will be described with reference to FIG. 1. Here, in FIG. 1 and the below-mentioned respective drawings, the X-axis direction in the drawing is a horizontal direction and corresponds to a reciprocating direction of a supply unit 8, and in this direction, the X1 direction corresponds to a forward direction and the X2 direction corresponds to a backward direction. Further, the Y-axis direction is a horizontal direction and also is a direction orthogonal to the X-axis direction, and corresponds to a direction in which a rotational axis of a roller 6 extends. Further, the Z-axis direction is a vertical direction and corresponds to a laminating direction of layers 500.

The "three-dimensional shaping" as used herein refers to the formation of a so-called stereoscopically shaped article, and also includes, for example, the formation of a shape having a thickness even if it is in a flat plate shape or a so-called two-dimensional shape.

The three-dimensional shaping apparatus 1 of this embodiment is a three-dimensional shaping apparatus for producing a three-dimensional shaped article by laminating the layers 500 including a layer 501, a layer 502, a layer 503, . . . , and a layer 50*n*. Then, as shown in FIG. 1, the three-dimensional shaping apparatus 1 of this embodiment includes a table unit 10 having a shaping table 9, a supply unit 8 that supplies a material of a three-dimensional shaped article to the shaping table 9, and a control unit 12 that controls the operation of the table unit 10 and the supply unit 8. The three-dimensional shaping apparatus 1 is configured to be electrically coupled to an external device 20 such as a personal computer so as to be able to receive an instruction from a user through the external device 20.

The shaping table 9 is configured to be able to move along the Z-axis direction by the control of the control unit 12. A shaping face 9*a* of the shaping table 9 is disposed at a position lower than an upper face portion 10*a* of the table unit 10 by a predetermined distance in the Z-axis direction, and one layer of the layers 500 is formed by supplying the material of the three-dimensional shaped article to the shaping face 9*a* from the supply unit 8. Then, downward movement of the shaping table 9 for a predetermined distance and supply of the material of the three-dimensional shaped article from the supply unit 8 are repeated, whereby the layers are laminated. FIG. 1 shows a state where a molded body S of the three-dimensional shaped article is formed on the shaping face 9*a* by repeating layer formation for four layers: a layer 501, a layer 502, a layer 503, and a layer 504. Here, the molded body S shows a state before being subjected to degreasing and sintering and is a so-called green body.

The supply unit 8 is configured to be able to move in the X-axis direction along a guide bar 11. Further, the supply unit 8 includes a material supply portion 2 that supplies a material containing a powder of a metal, a ceramic, a resin, or the like to the shaping table 9. As the material supply portion 2, a material supply portion 2A formed at a front-side end portion in the X1 direction and a material supply portion 2B formed at a front-side end portion in the X2 direction are included.

Further, the supply unit 8 includes the roller 6 capable of compressing and leveling the material supplied to the shaping table 9. As the roller 6, a roller 6A formed next to the material supply portion 2A in the X-axis direction, and a roller 6B formed next to the material supply portion 2B in the X-axis direction are included.

Further, the supply unit 8 includes a head 3 that ejects a liquid containing a binder for binding the powder contained in the material supplied from the material supply portion 2 to a shaping region P of the three-dimensional shaped article. As the head 3, a head 3A formed next to the roller 6A in the X-axis direction, and a head 3B formed next to the roller 6B in the X-axis direction are included. Here, the liquid to be ejected from the head 3A and the liquid to be ejected from the head 3B are the same liquid, and both are a liquid containing a UV curable resin as the binder. However, the liquid is not limited to such a liquid, and a liquid containing a thermoplastic resin as the binder, a liquid in a state where a solid resin as the binder is dissolved in a volatile solvent, or the like may be used.

Then, between the head 3A and the head 3B in the X-axis direction, a UV irradiation portion 4 that irradiates an ultraviolet ray capable of curing the UV curable resin is included. The supply unit 8 of this embodiment is configured to include one UV irradiation portion 4, however, a configuration in which two or more UV irradiation portions 4 are included, or according to the type or the like of the liquid to be used, a configuration in which the UV irradiation portion 4 is not included or a configuration in which a heater for curing a thermoplastic resin or volatilizing a solvent is included in place of the UV irradiation portion 4, or the like may be adopted.

As shown in FIG. 1, in the supply unit 8 of this embodiment, the shapes of the constituent members are symmetric in the X-axis direction. Therefore, the three-dimensional shaping apparatus 1 of this embodiment can perform the molded body forming step for the molded body S while moving the supply unit 8 in the X1 direction, and also can perform the molded body forming step for the molded body S while moving the supply unit 8 in the X2 direction.

In this manner, the three-dimensional shaping apparatus 1 of this embodiment includes the shaping table 9, the material supply portion 2 and the roller 6 as layer forming portions for forming the layer 500 that is a powder layer at the shaping table 9, the head 3 that ejects the liquid containing the binder from a nozzle to the shaping region P of the three-dimensional shaped article in the layer 500, and the control unit 12 that controls the movement of the head 3 with respect to the shaping table 9 and the driving of the head 3 by applying a voltage.

Next, specific examples of the material that can be used in the three-dimensional shaping apparatus 1 of this embodiment will be described. As a metal powder that can be contained in the material, for example, a simple substance powder of magnesium (Mg), iron (Fe), cobalt (Co), chromium (Cr), aluminum (Al), titanium (Ti), copper (Cu), or nickel (Ni), or a powder of an alloy containing one or more of these metals (a maraging steel, a stainless steel (SUS), cobalt-chromium-molybdenum, a titanium alloy, a nickel alloy, an aluminum alloy, a cobalt alloy, or a cobalt-chromium alloy), or a mixed powder thereof can be used.

Further, as a ceramic powder that can be contained in the material, for example, silicon dioxide, titanium dioxide, aluminum oxide, zirconium oxide, silicon nitride, or the like can be favorably used.

Further, as a resin powder that can be used in the material or a binder to be contained in the liquid, for example, PMMA (acrylic), ABS (acrylonitrile-butadiene-acrylate), ASA (acrylonitrile-styrene-acrylate), PLA (polylactic acid), PEI (polyetherimide), PC (polycarbonate), PP (polypropylene), PE (polyethylene), PA (polyamide), EP (epoxy), PPS (polyphenylene sulfide), PS (polystyrene), paraffin wax, PVA (polyvinyl alcohol), carboxymethyl cellulose, polyoxymethylene, polymethyl methacrylate, or the like can be preferably used. Further, for example, an acrylic resin, an epoxy resin, a silicone resin, a cellulosic resin, or another synthetic resin, or the like can be used alone or in combination with one another. In addition, a thermoplastic resin or a UV curable resin of a type using radical polymerization of an unsaturated double bond such as an acrylic or a type using cationic polymerization such as an epoxy can also be used.

Further, as a solvent to be contained in the liquid, for example, water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl n-butyl ketone, diisopropyl ketone, and acetyl acetone; alcohols such as ethanol, propanol, and butanol; tetra-alkyl ammonium acetates; sulfoxide-based solvents such as dimethyl sulfoxide and diethyl sulfoxide; pyridine-based solvents such as pyridine, γ-picoline, and 2,6-lutidine; ionic liquids such as tetra-alkyl ammonium acetate (for example, tetra-butyl ammonium acetate, etc.), and the like are exemplified. One type or a combination of two or more types selected from these can be used.

Figure 2:
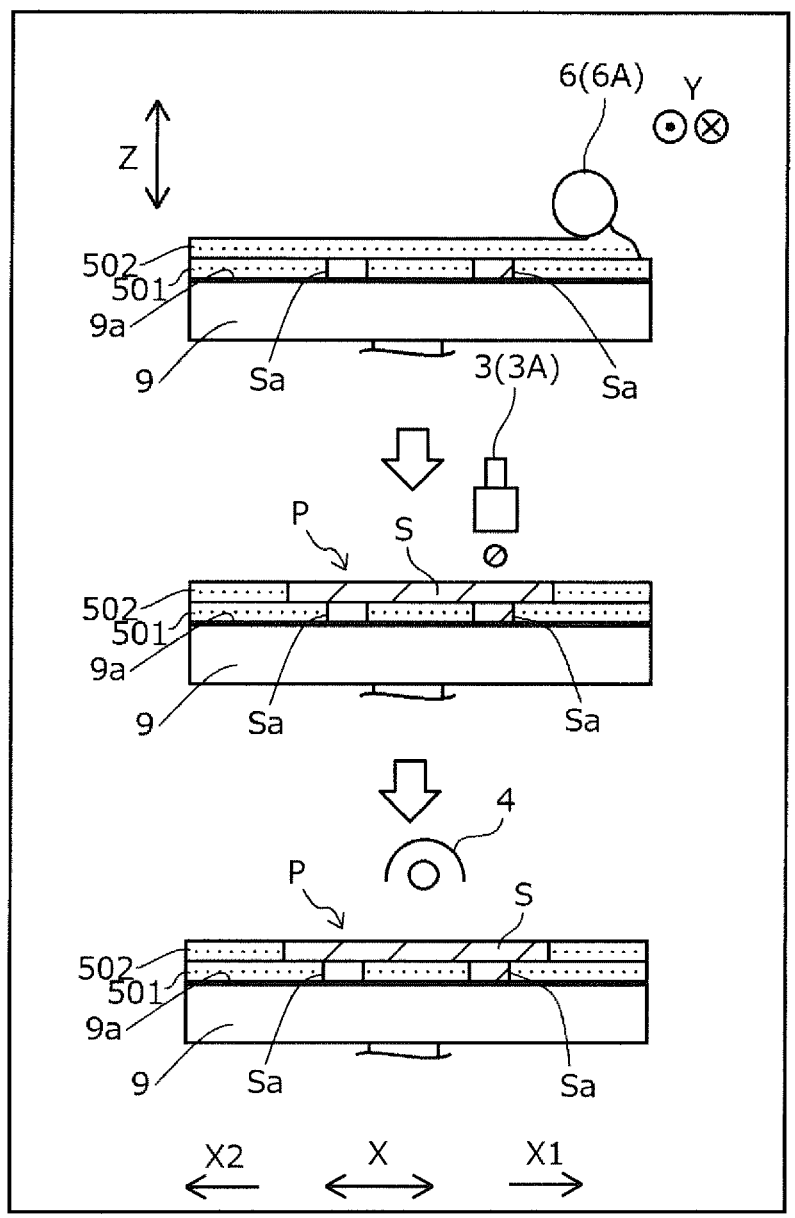
FIG. 2 is a schematic view for illustrating an example of the formation of a molded body to be performed using the three-dimensional shaping apparatus in FIG. 1.

Next, one example of a three-dimensional shaping method that can be performed using the three-dimensional shaping apparatus 1 in FIG. 1 and a sintering furnace capable of degreasing and sintering the molded body S will be described using the flowchart in FIG. 3 while referring to FIG. 2 and also FIGS. 4 and 5. FIG. 2 shows one example when forming the layer 502 in the layers 500 in the molded body S.

Figure 3:
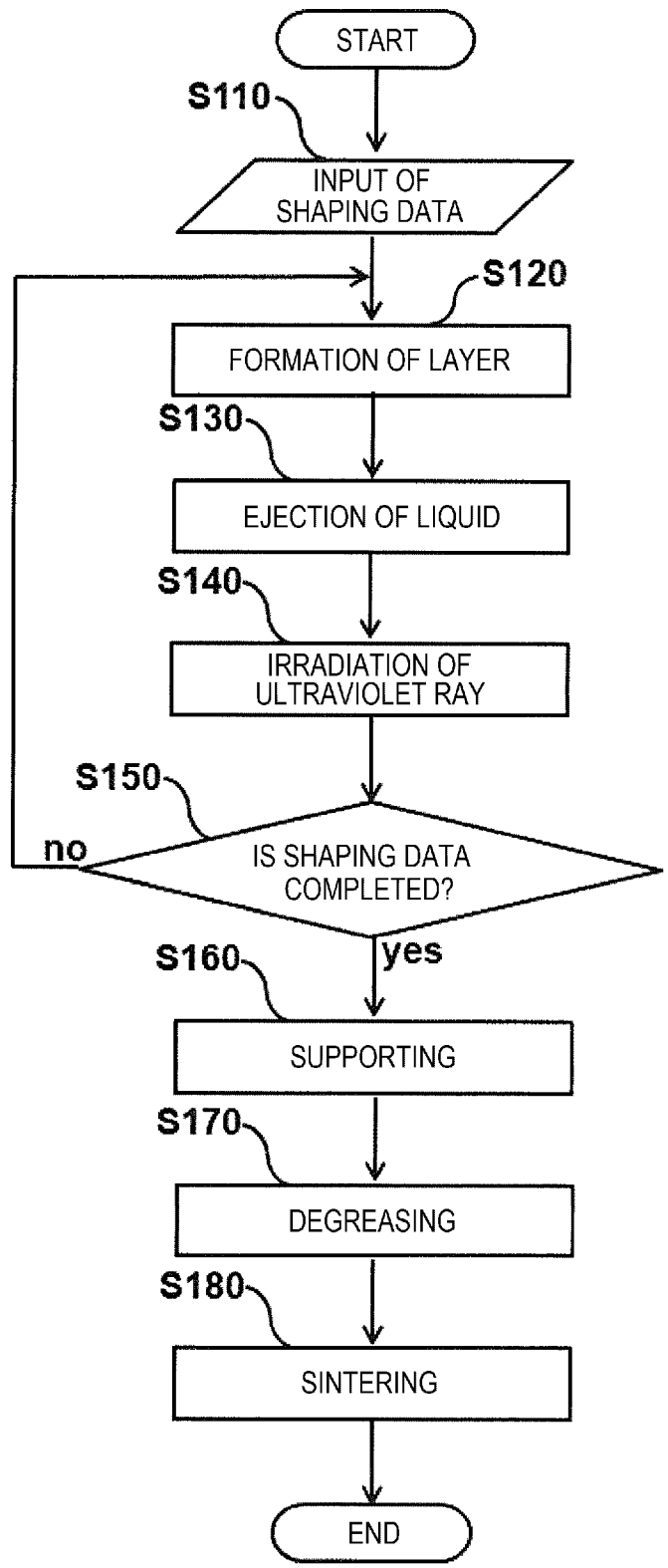
FIG. 3 is a flowchart of an embodiment of the three-dimensional shaping method according to the present disclosure.

In the method for producing a three-dimensional shaped article of this embodiment, as shown in FIG. 3, first, in a shaping data input step of Step S110, shaping data of a three-dimensional shaped article to be produced is input. The input source of the shaping data of the three-dimensional shaped article is not particularly limited, but the shaping data can be input to the three-dimensional shaping apparatus 1 using the external device 20.

Subsequently, in a layer forming step of Step S120, the layer 500 is formed by supplying the material from the material supply portion 2 to the shaping face 9a of the shaping table 9 and also compressing and leveling the material with the roller 6. The uppermost state of FIG. 2 shows a state where the layer 502 is formed by moving the supply unit 8 in the X1 direction. Here, when the layer 500 is formed by moving the supply unit 8 in the X1 direction, the layer 500 is formed by supplying the material from the material supply portion 2A and also compressing and leveling the material with the roller 6A. On the other hand, when the layer 500 is formed by moving the supply unit 8 in the X2 direction, the layer 500 is formed by supplying the material from the material supply portion 2B and also compressing and leveling the material with the roller 6B.

Subsequently, in a liquid ejection step of Step S130, the liquid containing the binder is ejected from the nozzle of the head 3 to the shaping region P of the three-dimensional shaped article in the layer 500. The second state from the top of FIG. 2 shows a state where the liquid is ejected from the nozzle of the head 3 to the shaping region P of the layer 502 while moving the supply unit 8 in the X1 direction. Here, when the layer 500 is formed by moving the supply unit 8 in the X1 direction, the liquid is ejected from the head 3A. On the other hand, when the layer 500 is formed by moving the supply unit 8 in the X2 direction, the liquid is ejected from the head 3B.

Subsequently, in a UV irradiation step of Step S140, an ultraviolet ray is irradiated from the UV irradiation portion 4 to the shaping region P of the three-dimensional shaped article in the layer 500. The lowermost state of FIG. 2 shows a state where an ultraviolet ray is irradiated from the UV irradiation portion 4 to the shaping region P of the three-dimensional shaped article in the layer 502 while moving the supply unit 8 in the X1 direction.

Then, in a shaping data completion determination step of Step S150, the control unit 12 of the three-dimensional shaping apparatus 1 determines whether or not all formation of the layers 500 based on the shaping data input in Step S110 is completed. When it is determined that not all formation of the layers 500 is completed, the process returns to the layer forming step of Step S120, and the subsequent layer 500 is formed. On the other hand, when it is determined that all formation of the layers 500 is completed, the process proceeds to a supporting step of Step S160.

The steps from Step S110 to Step S150 described above correspond to the molded body forming step of forming the molded body S to be performed using the three-dimensional shaping apparatus 1 shown in FIG. 1. Here, in the three-dimensional shaping method of this embodiment, in the molded body forming step, as shown in FIG. 2, a plurality of projection portions Sa are formed as the molded body S in the layer 501. Therefore, the molded body S formed by repeating the steps from Step S120 to Step S150 becomes a molded body having a plurality of projection portions Sa as shown in FIG. 4.

In the supporting step of Step S160, a user makes the support 5 support the molded body S formed by repeating the steps from Step S120 to Step S150 described above. In the support 5, the groove portions G extended in the X-axis direction are provided, and as shown in FIG. 5, the support 5 is made to support the molded body S so that each projection portion Sa of the molded body S is in a state of being inserted into the groove portion G. The support 5 of this embodiment is in a flat plate shape, and the groove portion G is a rectangular through-hole in which the X-axis direction is the longitudinal direction, but it is not limited to such a configuration. The support 5 need not be in a flat plate shape, and the groove portion G need not be a through-hole as long as the projection portion Sa can be inserted therein. Also the material of the support 5 is not particularly limited. It only needs to be a material that does not cause damage, change in shape, or the like in a degreasing step of Step S170 and a sintering step of Step S180 described below. Further, the support 5 may be shaped using the three-dimensional shaping apparatus 1 or the like, but a commercially available ready-made product or the like may be used.

Subsequently, in the degreasing step of Step S170, a resin component of the molded body S produced by repeating the steps from Step S120 to Step S150 such as the binder in the molded body S in a state of being supported by the support 5 is degreased using a sintering furnace or the like. The degreasing step of Step S170 may be performed using a device other than the sintering furnace. Further, as the degreasing method, other than a method in which the resin component is volatilized by heating, a method in which the resin component is dissolved by dipping the molded body S in a solvent, or the like can also be adopted. When a three-dimensional shaped article made of a resin is produced or the like, this degreasing step of Step S170 may be omitted depending on the type of the three-dimensional shaped article or the like.

Then, in the sintering step of Step S180, the material is sintered by heating the molded body S subjected to degreasing in the degreasing step of Step S170 in a sintering furnace or the like. The sintering step of Step S180 is also performed in a state where the molded body S is supported by the support 5 in the same manner as in the degreasing step of Step S170. By performing the degreasing step of Step S170 and the sintering step of Step S180, the molded body S is shrunk, but degreasing and sintering are performed in a state where the projection portions Sa of the molded body S are each inserted into the groove portion G in which the X-axis direction is the longitudinal direction, and therefore, shrinkage of the molded body S can be limited to one direction of the longitudinal direction, and distortion, twist, or strain due to shrinkage of the molded body S can be suppressed.

Also when a resin component such as the binder in the molded body S remains even after performing the degreasing step of Step S170, the resin component is removed with the execution of this sintering step of Step S180. Then, with the completion of the sintering step of Step S180, the method for producing a three-dimensional shaped article of this embodiment is completed.

As described above, the three-dimensional shaping method of this embodiment includes the molded body forming step from Step S120 to Step S150 of forming the molded body S having a plurality of projection portions Sa using a material containing a powder and a binder. Further, the method includes the supporting step of Step S160 of supporting the molded body S by the support 5. In the supporting step of Step S160, as shown in FIG. 5, the molded body S is supported by the support 5 having the groove portions G at positions configured to insert each of the projection portions Sa in a state where each of the plurality of projection portions Sa is inserted into the groove portion G. Then, the method includes the sintering step of Step S180 of sintering the powder constituting the molded body S by heating the molded body S in a state of being supported by the support 5. Here, as shown in FIG. 5, the groove portion G is configured such that the X-axis direction is the longitudinal direction, and is extended toward a central portion side in the X-axis direction from an insertion position I of the projection portion Sa. In other words, the groove portion G is extended from the insertion position I of the projection portion Sa in a specified direction D that specifies a direction of shrinkage of the molded body S by performing the sintering step.

In this manner, in the three-dimensional shaping method of this embodiment, the molded body S having a plurality of projection portions Sa is formed, and the sintering step is performed while specifying the direction of shrinkage of the molded body S in a state where each of the plurality of projection portions Sa is inserted into the groove portion G. In this manner, the shape of the groove portion G is formed so that it is extended in the X-axis direction that is the specified direction D, and therefore, the direction of shrinkage of the molded body S can be specified as the X-axis direction at which an excessive force is hardly applied. Therefore, by performing the three-dimensional shaping method of this embodiment, the molded body S can be shrunk without applying an excessive force to the molded body S, so that distortion, twist, strain, or the like of the three-dimensional shaped article to be shaped can be suppressed.

Here, the specified direction D according to the shape of the molded body S is, for example, a direction along the longitudinal direction of the molded body S. As shown in FIGS. 4 and 5, in the molded body S of this embodiment, the X-axis direction is set to the longitudinal direction. When performing the sintering step, the molded body S is largely shrunk along the longitudinal direction of the molded body S with the progress of the sintering step. However, by setting the extended direction of the groove portion G, that is, the specified direction D by the groove portion G to a direction along the longitudinal direction of the molded body S, distortion of the molded body S by applying an excessive force to the molded body S with the progress of the sintering step can be effectively suppressed.

Figure 4:
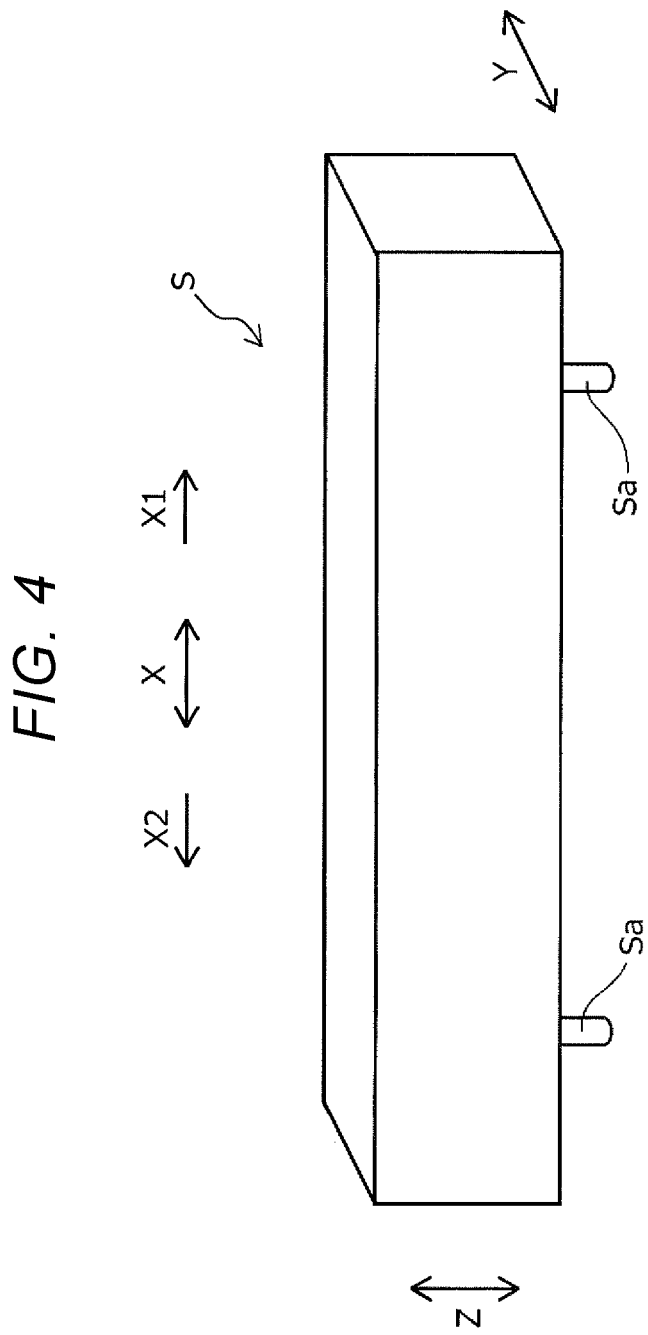
FIG. 4 is a schematic perspective view showing an example of a molded body to be subjected to a sintering step.
Figure 5:
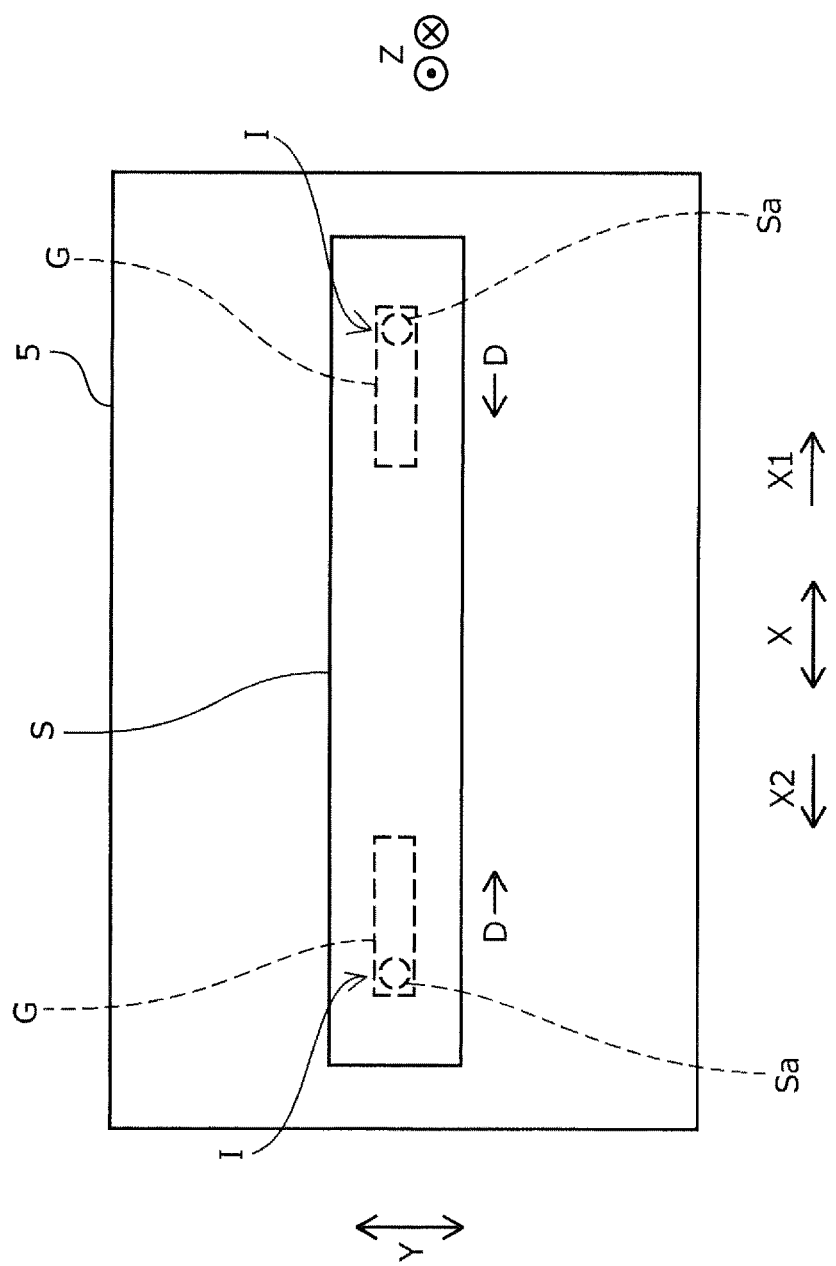
FIG. 5 is a schematic plan view showing a state where the molded body in FIG. 4 is supported by a support as an example.

As shown in FIGS. 4 and 5, the projection portion Sa is in a columnar shape. The shape of the projection portion Sa is not particularly limited, but is preferably a columnar shape, a cylindrical shape, or a conical shape. When the projection portion Sa is in a columnar shape, a cylindrical shape, or a conical shape, the projection portion Sa is hooked in the groove portion G when the molded body S is shrunk with the progress of the sintering step, and distortion by applying an excessive force to the molded body S can be effectively suppressed.

Further, as described above, as the powder contained in the material of the molded body S, various powders can be used, but it is preferred to use a metal powder. This is because a metal is sturdy, and therefore, a sturdy three-dimensional shaped article can be shaped in a state where distortion is suppressed.

Further, as described above, as the support 5, a support made of any of various materials can be used, however, the support 5 is preferably made of a ceramic. The ceramic is sturdy and is strong against heat, and therefore, by using a support made of a ceramic as the support 5, the three-dimensional shaped article can be shaped at the support 5 that is sturdy and is strong against heat.

The support 5 shown in FIG. 5 has the groove portion G in a rectangular shape in which the X-axis direction is the longitudinal direction. However, the shape of the groove portion G is not limited to a rectangular shape as long as it is configured to be extended from the insertion position I of the projection portion Sa in the specified direction D that specifies the direction of shrinkage of the molded body S. For example, as shown in FIG. 6, it may have the groove portion G that is in a triangular shape in which the X-axis direction is the longitudinal direction and that has a width becoming narrower along the specified direction D specifying the direction of shrinkage of the molded body S.

Figure 6:
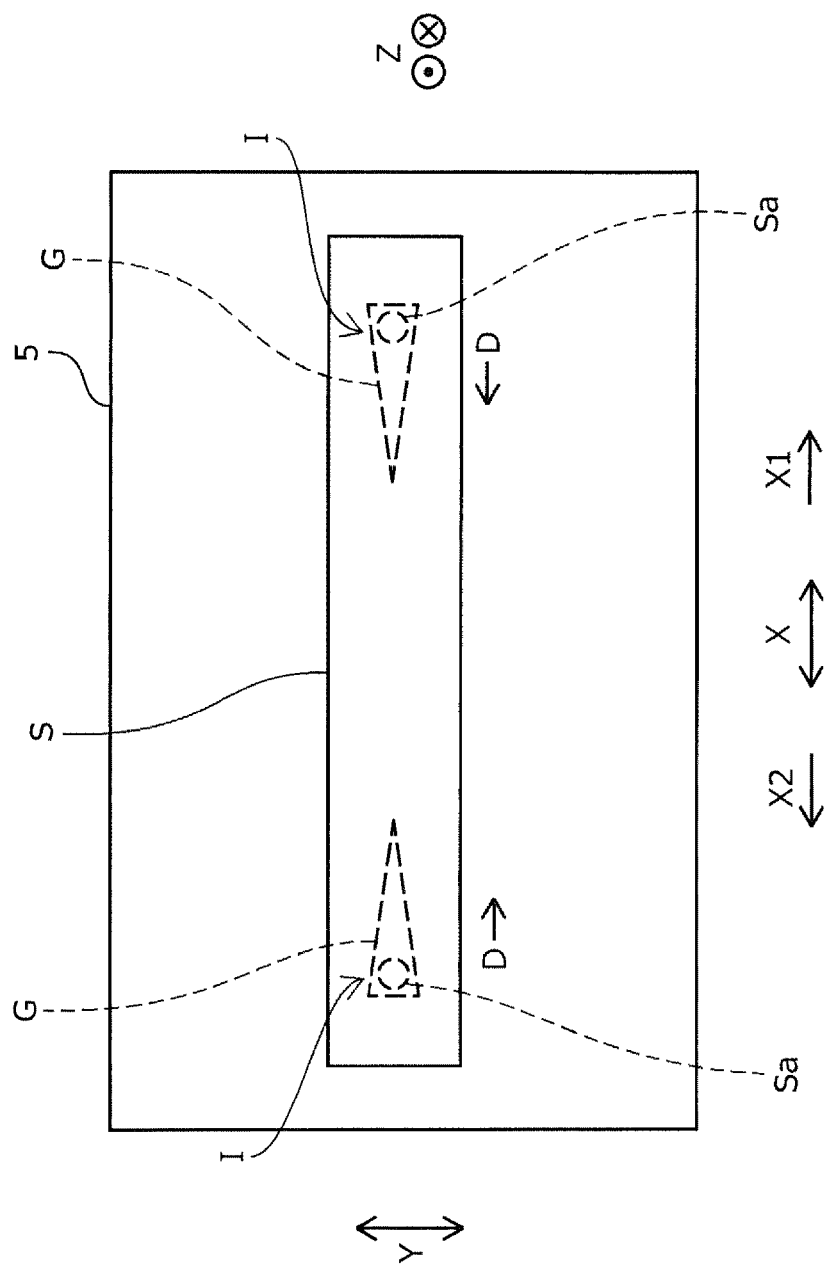
FIG. 6 is a schematic plan view showing a state where the molded body in FIG. 4 is supported by a support different from the support in FIG. 5.

As in the case of the groove portion G of the support 5 shown in FIG. 6, by configuring such that the width becomes narrower toward the direction of being extended from the insertion position I of the projection portion Sa, deviation from the specified direction D can be effectively suppressed. The reason for this is that the molded body S is shrunk as a whole with the progress of the sintering step, and therefore, the projection portion Sa is also shrunk, however, even if the projection portion Sa is shrunk and narrowed, by configuring such that the width of the groove portion G becomes narrower toward the direction of being extended from the insertion position I of the projection portion Sa, a gap between the groove portion G and the projection portion Sa in a direction crossing the specified direction D can be kept small, so that deviation from the specified direction D due to the narrowing of the projection portion Sa can be suppressed.

In the molded body S and the support 5 shown in FIG. 5, and in the molded body S and the support 5 shown in FIG. 6, the specified direction D by the groove portion G is a direction along the X-axis direction, in other words, a direction along a direction of a straight line coupling two projection portions Sa. In this manner, the specified direction D by the groove portion G is preferably a direction along a direction of a straight line coupling at least two of the plurality of projection portions Sa. This is because the intervals of the plurality of projection portions Sa become smaller with the progress of the sintering step, however, by setting the specified direction D to a direction along the direction of a straight line coupling two projection portions Sa, distortion by applying an excessive force to the molded body S can be effectively suppressed.

As described above, the molded body S and the support 5 shown in FIG. 5, and the molded body S and the support 5 shown in FIG. 6 include two projection portions Sa and two groove portions G, respectively, and it is configured such that the longitudinal direction of the molded body S and the extended direction of the groove portion G match with each other. However, it is not limited to such a configuration. Such members may include three or more projection portions Sa and three or more groove portions G, respectively. Further, it may be configured such that the longitudinal direction of the molded body S and the extended direction of the groove portion G do not match with each other. Moreover, it may be configured such that both the groove portion G whose extended direction matches with the longitudinal direction of the molded body S and the groove portion G whose extended direction does not match with the longitudinal direction of the molded body S are included. Hereinafter, examples of the molded bodies S having various configurations and the support 5 will be described. However, the present disclosure is not limited to such configuration examples.

Figure 7:
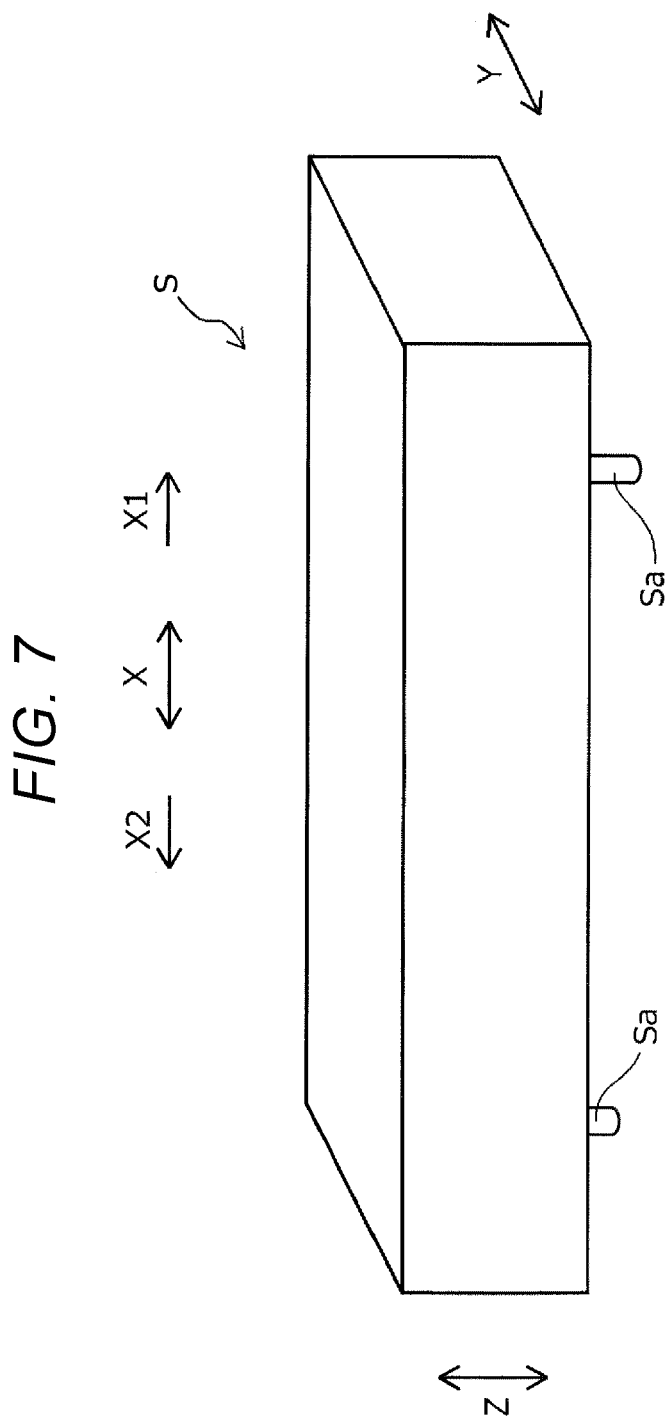
FIG. 7 is a schematic perspective view showing an example of a molded body having a different shape from that of the molded body in FIG. 4.
Figure 8:
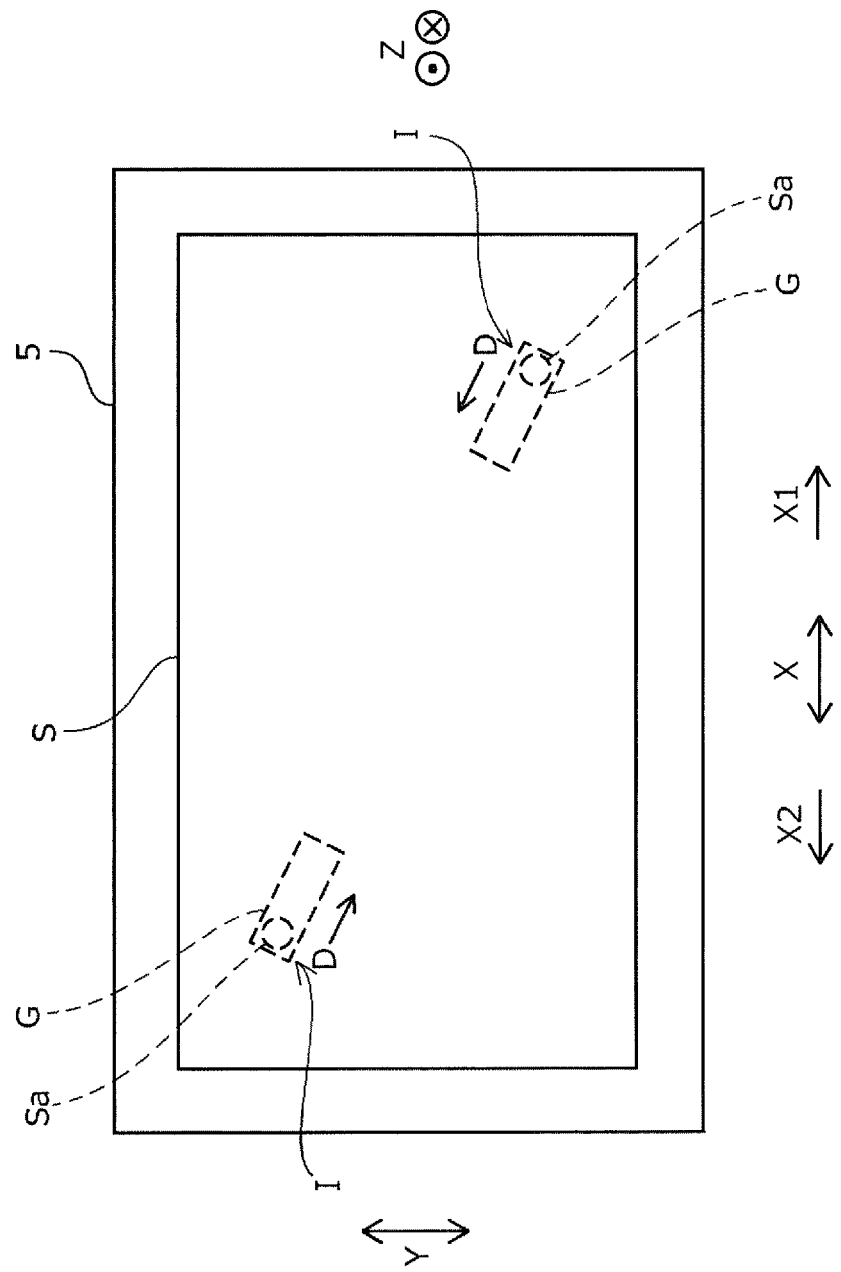
FIG. 8 is a schematic plan view showing a state where the molded body in FIG. 7 is supported by a support as an example.

The molded body S shown in FIGS. 7 and 8 and the support 5 shown in FIG. 8 are a configuration example in which the longitudinal direction of the molded body S and the extended direction of the groove portion G do not match with each other. As shown in FIGS. 7 and 8, the longitudinal direction of the molded body S that is a rectangular parallelepiped body is a direction along the X-axis direction, but as shown in FIG. 8, the extended direction of the groove portion G corresponding to the specified direction D is a direction along a diagonal line of the molded body S that is a rectangular parallelepiped body in plan view.

Figure 9:
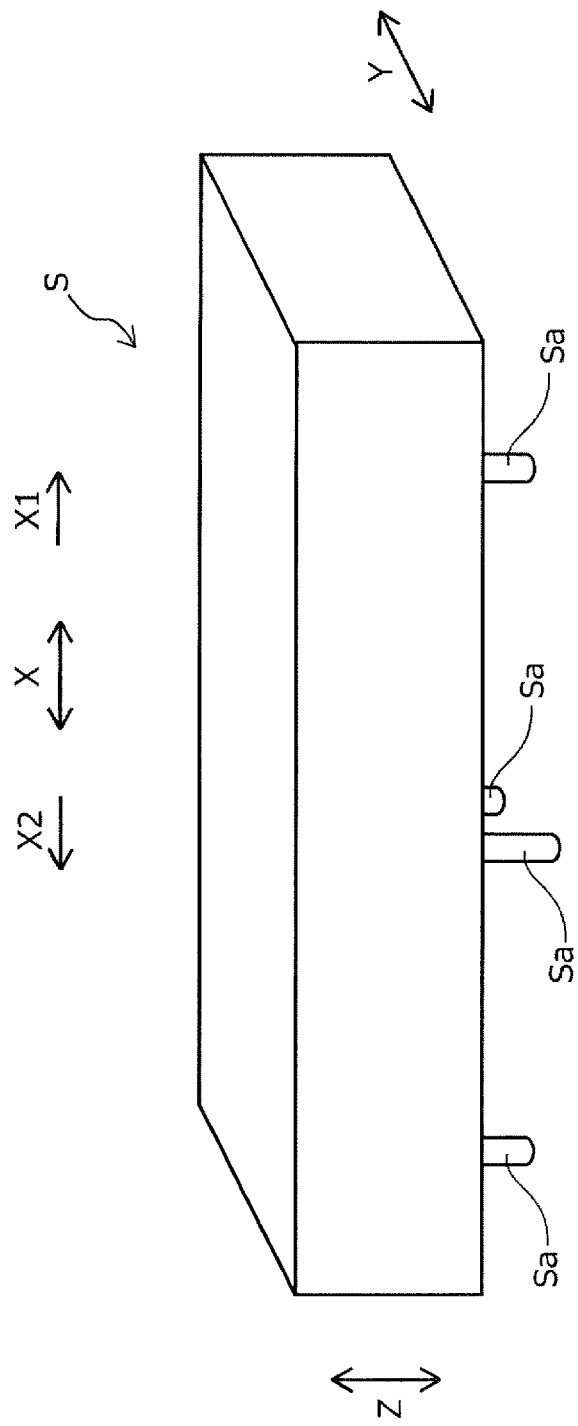
FIG. 9 is a schematic perspective view showing an example of a molded body having a different shape from those of the molded bodies in FIGS. 4 and 7.
Figure 10:
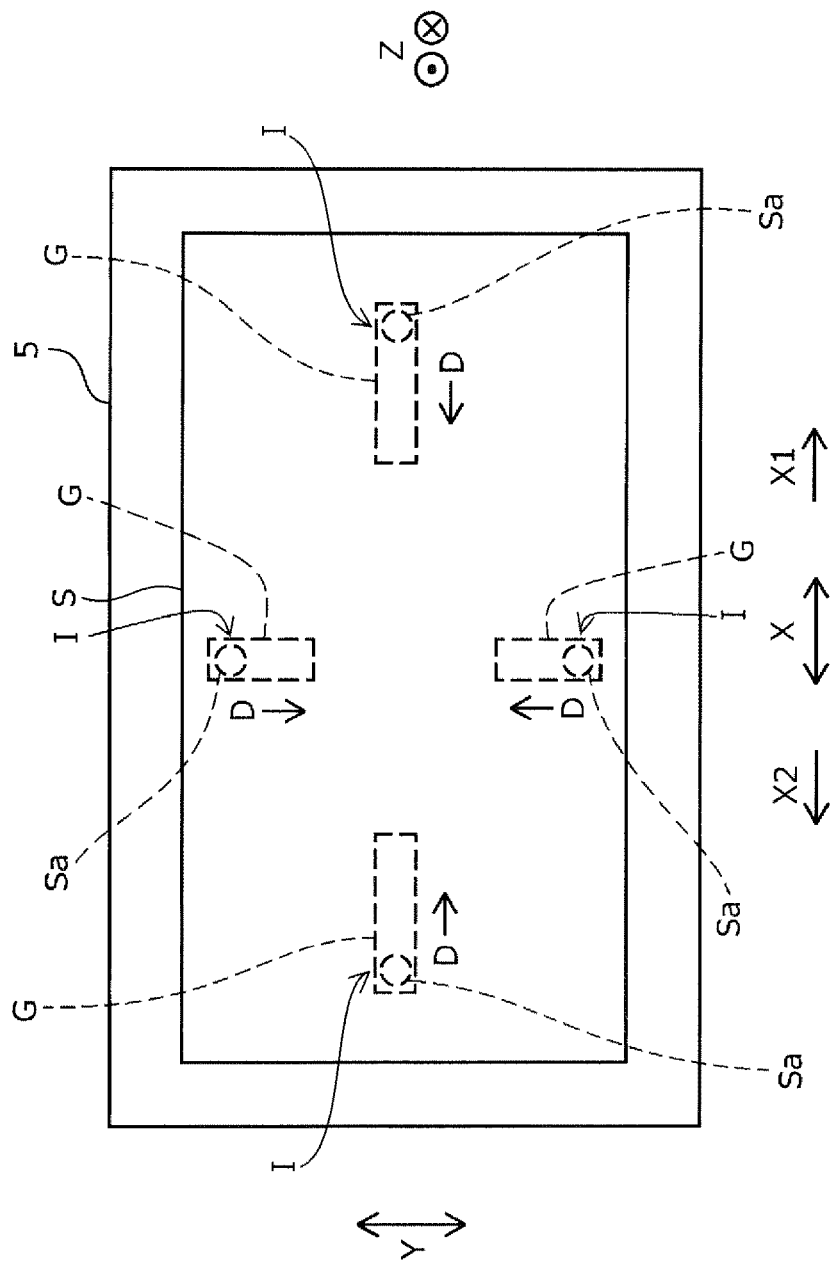
FIG. 10 is a schematic plan view showing a state where the molded body in FIG. 9 is supported by a support as an example.

The molded body S shown in FIGS. 9 and 10 and the support 5 shown in FIG. 10 are a configuration example in which both the groove portion G whose extended direction matches with the longitudinal direction of the molded body S and the groove portion G whose extended direction does not match with the longitudinal direction of the molded body S are included. As shown in FIGS. 9 and 10, the molded body S that is a rectangular parallelepiped body has four projection portions Sa, and the groove portions G capable of inserting two projection portions Sa among these are extended along the longitudinal direction of the molded body S parallel to the X-axis direction, and the groove portions G capable of inserting the other two projection portions Sa are extended along the transverse direction of the molded body S parallel to the Y-axis direction.

Figure 11:
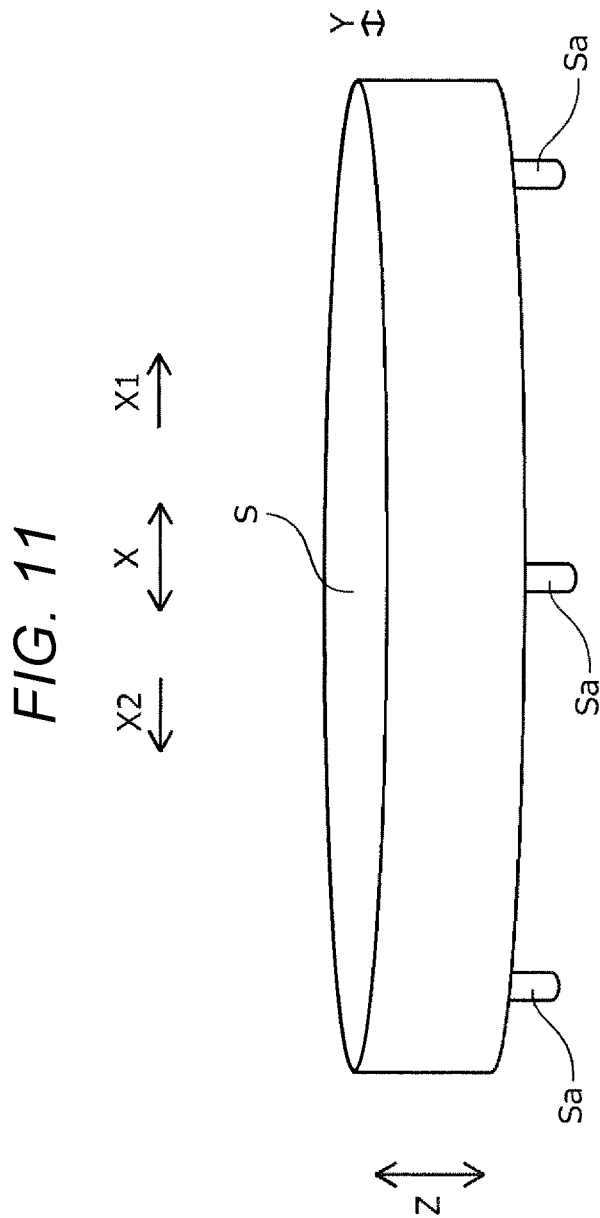
FIG. 11 is a schematic perspective view showing an example of a molded body having a different shape from those of the molded bodies in FIGS. 4, 7, and 9.
Figure 12:
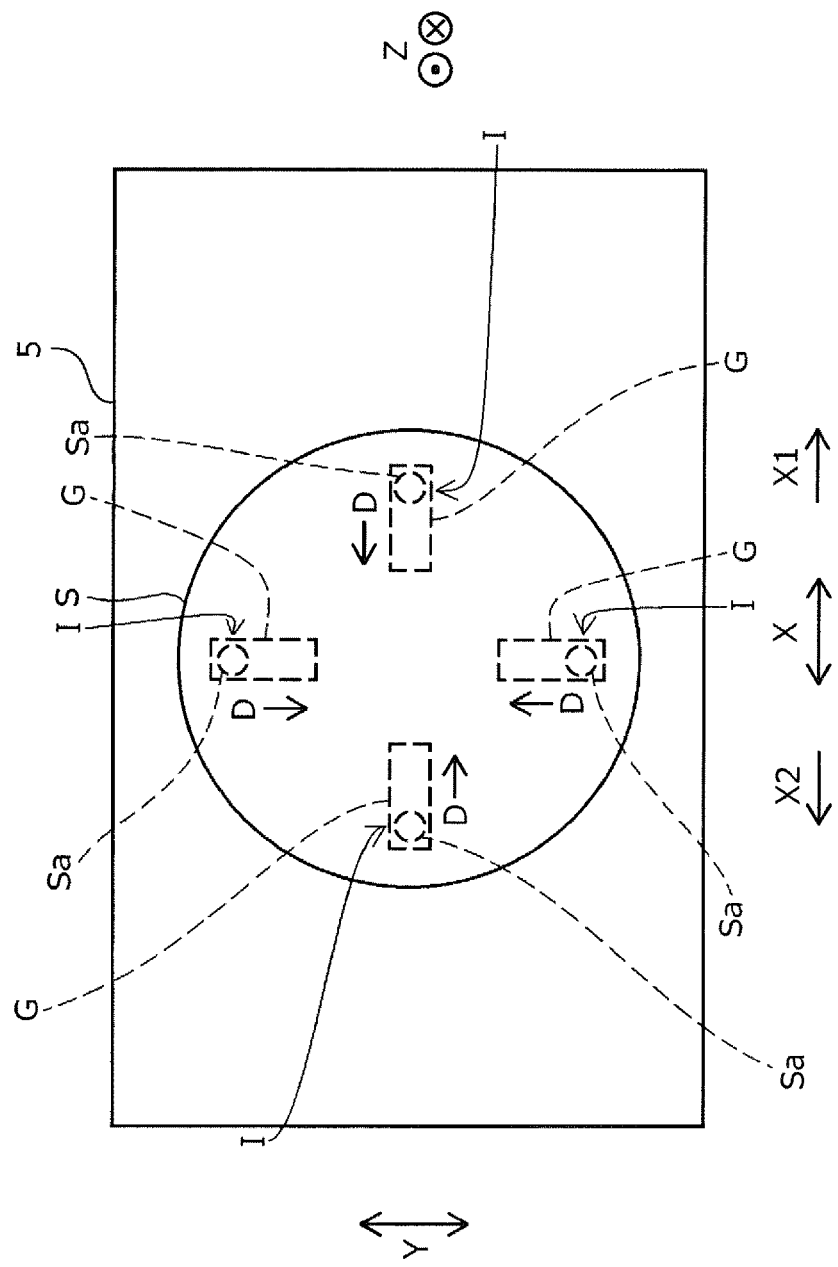
FIG. 12 is a schematic plan view showing a state where the molded body in FIG. 11 is supported by a support as an example.

The molded body S shown in FIGS. 11 and 12 is in a circular shape in plan view and has four projection portions Sa. Further, the support 5 shown in FIG. 12 has four groove portions G extended toward the center of the molded body S in a circular shape in plan view from the insertion positions I of the projection portions Sa. The molded body S shown in FIGS. 11 and 12 is in a circular shape in plan view, and therefore cannot be expressed in the concepts of the longitudinal direction and the transverse direction. Therefore, the molded body S shown in FIGS. 11 and 12 and the support 5 shown in FIG. 12 are a configuration example in which the longitudinal direction of the molded body S and the extended direction of the groove portion G do not match with each other.

Figure 13:
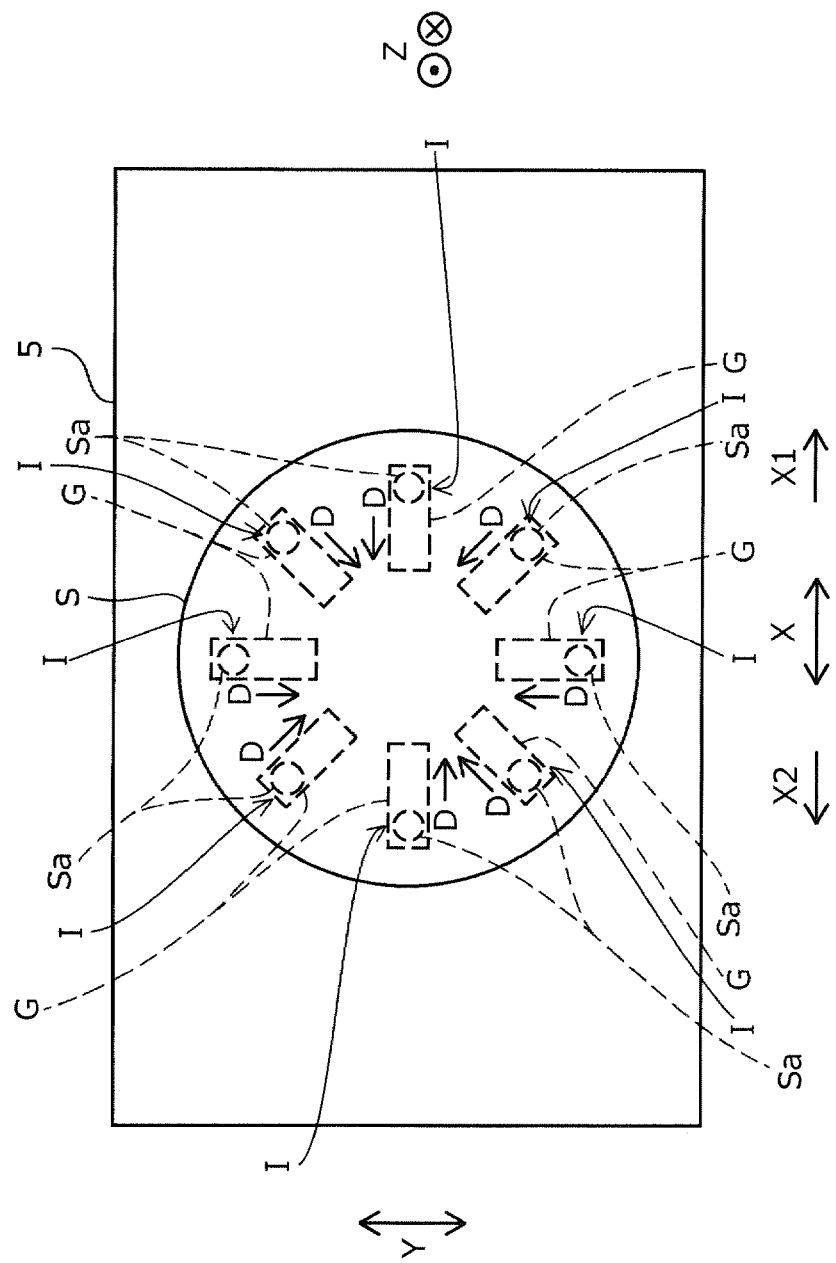
FIG. 13 is a schematic plan view showing a state where a molded body having a different shape from those of the molded bodies in FIGS. 4, 7, 9, and 11 is supported by a support as an example.

The molded body S shown in FIG. 13 is in a circular shape in plan view and has eight projection portions Sa. Further, the support 5 shown in FIG. 13 has eight groove portions G extended toward the center of the molded body S in a circular shape in plan view from the insertion positions I of the projection portions Sa. That is, the molded body S shown in FIG. 13 and the support 5 shown in FIG. 13 are also a configuration example in which the longitudinal direction of the molded body S and the extended direction of the groove portion G do not match with each other in the same manner as the molded body S shown in FIGS. 11 and 12 and the support 5 shown in FIG. 12.

The molded body S shown in FIG. 14 has a hole portion that is in a square shape in plan view and that penetrates in the Z-axis direction, and also is in a quadratic prism shape flattened in the Z-axis direction, and has four projection portions Sa. The molded body S shown in FIG. 14 is in a square shape in plan view, and cannot be expressed in the concepts of the longitudinal direction and the transverse direction. Further, the support 5 shown in FIG. 14 has four groove portions G extended toward the center of the hole portion in a square shape in plan view in the molded body S from the insertion positions I of the projection portions Sa. The molded body S shown in FIG. 14 and the support 5 shown in FIG. 14 are a configuration example in which the longitudinal direction of the molded body S and the extended direction of the groove portion G do not match with each other.

The molded body S shown in FIG. 15 has a portion extended along the X-axis direction and a portion extended along the Y-axis direction, is in an L shape in plan view, and has four projection portions Sa. Then, a direction along the X-axis direction is set to the longitudinal direction. Further, the support 5 shown in FIG. 15 has two groove portions G extended along the X-axis direction and two groove portions G extended along the Y-axis direction. The molded body S shown in FIG. 15 and the support 5 shown in FIG. 15 are a configuration example in which both the groove portion G whose extended direction matches with the longitudinal direction of the molded body S and the groove portion G whose extended direction does not match with the longitudinal direction of the molded body S are included.

The present disclosure is not limited to the above-mentioned embodiments, but can be realized in various configurations without departing from the gist of the present disclosure. The technical features in the embodiments corresponding to the technical features in the respective aspects described in "SUMMARY" of the present disclosure may be appropriately replaced or combined in order to solve part or all of the problems described above or achieve part or all of the advantageous effects described above. Further, the technical features may be appropriately deleted unless they are described as essential features in the specification.

What is claimed is:

1. A three-dimensional shaping method, comprising:
   a molded body forming step of forming a molded body having a plurality of projection portions using a material containing a powder and a binder, the plurality of projections extending in a first direction;
   a supporting step of supporting the molded body by a support having elongate groove portions at positions configured to insert each of the projection portions in a state where the plurality of projection portions are inserted into the elongate groove portions; and
   a sintering step of sintering the powder by heating the molded body in a state of being supported by the support, wherein
   the elongate groove portion extends from an insertion position of the projection portion in a specified direction towards a center of the molded body, the specified direction specifies a direction of shrinkage of the molded body to allow controlled shrinkage of the molded body in the specified direction that is transverse to the first direction and toward the center of the molded body, the projection portion moving longitudinally along the elongate groove portion in the direction of shrinkage of the molded body during the sintering step.

2. The three-dimensional shaping method according to claim 1, wherein the specified direction is a direction along a direction of a straight line coupling at least two of the plurality of projection portions.

3. The three-dimensional shaping method according to claim 1, wherein the specified direction is a direction along a longitudinal direction of the molded body.

4. The three-dimensional shaping method according to claim 1, wherein the elongate groove portion has a width that becomes narrower toward a direction of being extended from the insertion position of the projection portion.

5. The three-dimensional shaping method according to claim 1, wherein the projection portion is in a columnar shape, a cylindrical shape, or a conical shape.

6. The three-dimensional shaping method according to claim 1, wherein the powder is a metal powder.

7. The three-dimensional shaping method according to claim 1, wherein the support is made of a ceramic.

* * * * *